United States Patent
Cocchiarella et al.

(10) Patent No.: US 12,488,091 B2
(45) Date of Patent: Dec. 2, 2025

(54) DISABLING FUNCTIONALITY OF AN AUTO-CHECKOUT CLIENT APPLICATION BASED ON ANOMALOUS USER BEHAVIOR

(71) Applicant: Maplebear Inc., San Francisco, CA (US)

(72) Inventors: Dominic Cocchiarella, Berkeley, CA (US); Andrew Peters, Tiburon, CA (US); Brandon Leonardo, Redwood City, CA (US); Samuel Slezek, San Diego, CA (US); Spencer Schack, Seattle, WA (US)

(73) Assignee: Maplebear Inc., San Francisco, CA (US)

( * ) Notice: Subject to any disclaimer, the term of this patent is extended or adjusted under 35 U.S.C. 154(b) by 131 days.

(21) Appl. No.: 18/370,516

(22) Filed: Sep. 20, 2023

(65) Prior Publication Data

US 2024/0095342 A1 Mar. 21, 2024

Related U.S. Application Data

(60) Provisional application No. 63/376,312, filed on Sep. 20, 2022.

(51) Int. Cl.
*G06F 21/54* (2013.01)
*G06F 11/34* (2006.01)
*G06Q 20/20* (2012.01)
*G06Q 30/0601* (2023.01)

(52) U.S. Cl.
CPC ............ *G06F 21/54* (2013.01); *G06F 11/34* (2013.01); *G06Q 20/20* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 11,195,222 B2 | 12/2021 | Archak et al. | |
| 11,423,467 B2 | 8/2022 | Bronicki | |
| 11,847,689 B2 * | 12/2023 | Glaser | G06Q 90/20 |
| 11,928,714 B1 * | 3/2024 | Raipati | G06Q 30/0607 |
| 12,050,960 B2 | 7/2024 | Yang et al. | |
| 2017/0053115 A1 * | 2/2017 | Healy | G06Q 20/20 |

FOREIGN PATENT DOCUMENTS

JP 7191288 B2 * 12/2022

* cited by examiner

*Primary Examiner* — Jeffrey R Swearingen
(74) *Attorney, Agent, or Firm* — Fenwick & West LLP

(57) ABSTRACT

An automated checkout system aims to detect and disable certain functionalities of an auto-checkout client application if a user exhibits anomalous behavior. The system collects user interaction data to describe the user's interactions with the client device through the application. It then uses a behavior scoring model on the data to generate an anomalous behavior score, indicating the likelihood of anomalous behavior. For instance, if a user scans an item far from its usual location, the score may suggest atypical behavior. The system employs the behavior score to identify functionalities to disable by comparing it to a set of threshold values. Each threshold corresponds to specific auto-checkout application functionalities to be disabled if the behavior score reaches the thresholds. For example, if a threshold is related to identifying items by image capture, the system may disable this feature if the score exceeds the threshold value.

20 Claims, 3 Drawing Sheets

| Threshold Values 300 | Functionalities 310 |
|---|---|
| 0.25-0.3 | Prompt User to Capture Image of Items |
| 0.31-0.4 | Prompt User to Capture Image of Items; Disable Auto Item ID |
| 0.41-0.5 | Require User Audit |
| 0.51-0.75 | Disable Auto-Checkout |
| 0.75+ | Disable Auto-Checkout; Alert Employees |

FIG. 3

DISABLING FUNCTIONALITY OF AN AUTO-CHECKOUT CLIENT APPLICATION BASED ON ANOMALOUS USER BEHAVIOR

CROSS-REFERENCE TO RELATED APPLICATIONS

This application claims the benefit of priority to U.S. Provisional Patent Application No. 63/376,312, entitled "Disabling Auto-Checkout Features to Prevent Theft" and filed Sep. 20, 2022, which is incorporated by reference.

BACKGROUND

An automated checkout system allows a user at a brick-and-mortar location to complete a checkout process for items with reduced or no assistance from a human operator at the location. For example, an automated checkout system may allow users to use client devices (e.g., smartphones or smart shopping carts) that execute an auto-checkout client application to scan items as the users traverse the location and perform a checkout process through the client devices. However, some users may take advantage of the reduced oversight from automated checkout systems to deceive the system to their benefit. For example, users may try to scan a different item from the one they actually collect or may misidentify themselves to the automated checkout system to collect an item that they are otherwise restricted from collecting. Thus, while automated checkout systems provide a more convenient checkout experience for users, these systems often suffer from serious vulnerabilities to malicious behavior by users.

SUMMARY

In accordance with one or more aspects of the disclosure, an automated checkout system disables functionality of an auto-checkout client application operating on a client device based on a predicted likelihood that a user is performing anomalous behavior. The automated checkout system collects user interaction data that describes the user's interactions with a client device through the auto-checkout application. The automated checkout system applies a behavior scoring model to the user interaction data to generate an anomalous behavior score, which indicates a likelihood that the user interaction data describes anomalous behavior by the user. For example, if the user interaction data describes a user scanning an item through the client device while the client device is located far away from where the item is normally located within the store, the behavior scoring model may generate an anomalous behavior score that indicates that the user's behavior is likely to be anomalous.

The automated checkout system uses the anomalous behavior score to identify functionalities to be disabled. The automated checkout system compares the anomalous behavior score to each of a set of threshold values. Each of these threshold values corresponds to one or more functionalities of the auto-checkout application to be disabled if the anomalous behavior score meets the threshold values. For example, if a threshold value corresponds to the functionality of identifying items collected by a user based on images captured by a camera, the automated checkout system may disable that functionality if the anomalous behavior score exceeds that threshold value.

By using a behavior scoring model to predict the likelihood that a user is performing anomalous behavior, the automated checkout system can identify types of anomalous behavior in user interaction data that a human reviewing that information may otherwise miss. Furthermore, by quantifying the likelihood of anomalous behavior with the score and disabling functionalities of the auto-checkout application based on where that score falls within a set of threshold values, the automated checkout system caters how to respond to the potential anomalous behavior based on the risk and thereby avoids under- or over-responding.

BRIEF DESCRIPTION OF DRAWINGS

FIG. 3 illustrates example threshold values 300 and corresponding functionalities 310 to be disabled, in accordance with one or more embodiments.

Figure 1:
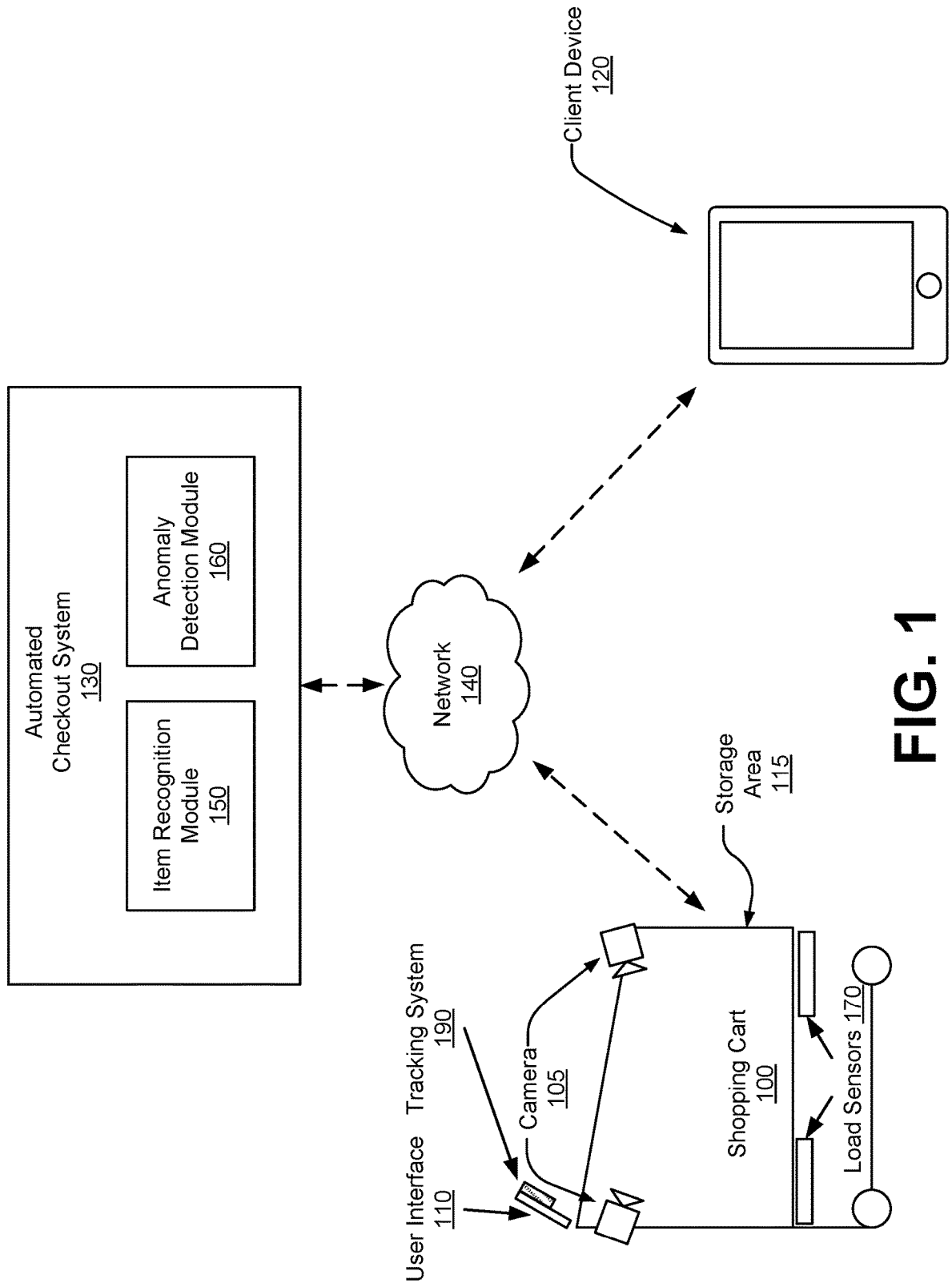
FIG. 1 illustrates an example environment of an automated checkout system, in accordance with one or more embodiments.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict various embodiments for purposes of illustration only. One skilled in the art will readily recognize from the following description that alternative embodiments of the structures and methods illustrated herein may be employed without departing from the principles of the disclosure described herein.

DETAILED DESCRIPTION

Example System Environment for Automated Checkout System

FIG. 1 illustrates an example system environment for an automated checkout system, in accordance with one or more illustrative embodiments. The system environment illustrated in FIG. 1 includes a shopping cart 100, a client device 120, an automated checkout system 130, and a network 140. Alternative embodiments may include more, fewer, or different components from those illustrated in FIG. 1, and the functionality of each component may be divided between the components differently from the description below. For example, a client device or a shopping cart may perform functionality described below as performed by the automated checkout system. Similarly, a user may interact with the automated checkout system using a shopping cart or a client device, and the functionality described below for one of these devices may, in some embodiments, be performed by the other.

A shopping cart 100 is a vessel that a user can use to hold items as the user travels through a store. The shopping cart 100 includes one or more cameras 105 that capture image data of the shopping cart's storage area and a user interface 110 that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors).

The cameras 105 capture image data of the shopping cart's storage area. The cameras 105 may capture twodimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In one or more embodiments, the cameras 105 include embedded processing capabilities to process image data captured by the cameras 105. For example, the cameras 105 may be mobile industry processor interface (MIPI) cameras.

In one or more embodiments, the shopping cart 100 captures image data in response to detecting that an item is being added to the storage area. The shopping cart 100 may detect that an item is being added to the storage area 115 of the shopping cart 100 based on sensor data from sensors on the shopping cart 100. For example, the shopping cart 100 may detect that a new item has been added when the shopping cart 100 (e.g., load sensors 170) detects a change in the overall weight of the contents of the storage area 115 based on load data from load sensors. Similarly, the shopping cart 100 may detect that a new item is being added based on proximity data from proximity sensors indicating that something is approaching the storage area of the shopping cart 100. The shopping cart 100 may capture image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 may include one or more sensors that capture measurements describing the shopping cart 100, items in the shopping cart's storage area, or the area around the shopping cart 100. For example, the shopping cart 100 may include load sensors 170 that measure the weight of items placed in the shopping cart's storage area. Load sensors 170 are further described below. Similarly, the shopping cart 100 may include proximity sensors that capture measurements for detecting when an item is added to the shopping cart 100. The shopping cart 100 may transmit data from the one or more sensors to the automated checkout system 130.

The one or more load sensors 170 capture load data for the shopping cart 100. In one or more embodiments, the one or more load sensors 170 may be scales that detect the weight (e.g., the load) of the content in the storage area 115 of the shopping cart 100. The load sensors 170 can also capture load curves—the load signal produced over time as an item is added to the cart or removed from the cart. The load sensors 170 may be attached to the shopping cart 100 in various locations to pick up different signals that may be related to items added at different positions of the storage area. For example, a shopping cart 100 may include a load sensor 170 at each of the four corners of the bottom of the storage area 115. In some embodiments, the load sensors 170 may record load data continuously while the shopping cart 100 is in use. In other embodiments, the shopping cart 100 may include some triggering mechanism, for example a light sensor, an accelerometer, or another sensor to determine that the user is about to add an item to the shopping cart 100 or about to remove an item from the shopping cart 100. The triggering mechanism causes the load sensors 170 to begin recording load data for some period of time, for example a preset time range.

The shopping cart 100 includes a user interface 110 through which the user can interact with the automated checkout system 130. The user interface 110 may include a display, a speaker, a microphone, a keypad, or a payment system (e.g., a credit card reader). The user interface 110 may allow the user to adjust the items in their shopping list or to provide payment information for a checkout process. Additionally, the user interface 110 may display a map of the store indicating where items are located within the store. In one or more embodiments, a user may interact with the user interface 110 to search for items within the store, and the user interface 110 may provide a real-time navigation interface for the user to travel from their current location to an item within the store. The user interface 110 also may display additional content to a user, such as suggested recipes or items for purchase.

The shopping cart 100 may include one or more wheel sensors (not shown) that measure wheel motion data of the one or more wheels. The wheel sensors may be coupled to one or more of the wheels on the shopping cart. In one or more embodiments, a shopping cart 100 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels (e.g., information specifying one or more attributes of the rotation of the one or more wheels). Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor may be a rotary encoder, a magnetometer with a magnet coupled to the wheel, an imaging device for capturing one or more features on the wheel, some other type of sensor capable of measuring wheel motion data, or some combination thereof.

The shopping cart 100 includes a tracking system 190 configured to track a position, an orientation, movement, or some combination thereof of the shopping cart 100 in an indoor environment. The tracking system 190 may be a computing system comprising at least one processor and computer memory. The tracking system 190 may further include other sensors capable of capturing data useful for determining position, orientation, movement, or some combination thereof of the shopping cart 100. Other example sensors include, but are not limited to, an accelerometer, a gyroscope, etc. The tracking system 190 may provide real-time location of the shopping cart 100 to an online system and/or database. The location of the shopping cart 100 may inform content to be displayed by the user interface 110. For example, if the shopping cart 100 is located in one aisle, the display can provide navigational instructions to a user to navigate them to a product in the aisle. In other example use cases, the display can provide suggested products or items located in the aisle based on the user's location.

A user can also interact with the shopping cart 100 or the automated checkout system 130 through a client device 120. The client device 120 can be a personal or mobile computing device, such as a smartphone, a tablet, a laptop computer, or desktop computer. In one or more embodiments, the client device 120 executes a client application that uses an application programming interface (API) to communicate with the automated checkout system 130 through the network 140. The client device 120 may allow the user to add items to a shopping list and to checkout through the automated checkout system 130. For example, the user may use the client device 120 to capture image data of items that the user is selecting for purchase, and the client device 120 may provide the image data to the automated checkout system 130 to identify the items that the user is selecting. The client device 120 may adjust the user's shopping list based on the identified item. In one or more embodiments, the user can also manually adjust their shopping list through the client device 120.

The automated checkout system 130 allows a customer at a brick-and-mortar store to complete a checkout process in which items are scanned and paid for without having to go through a human cashier at a point-of-sale station. The automated checkout system 130 receives data describing a user's shopping trip in a store and generates a shopping list based on items that the user has selected. For example, the automated checkout system 130 may receive image data from a shopping cart 100 and may determine, based on the image data, which items the user has added to their cart. When the user indicates that they are done shopping at the store, the automated checkout system 130 facilitates a transaction between the user and the store for the user to purchase their selected items. As noted above, while the automated checkout system 130 is depicted in FIG. 1 as separate from the shopping cart 100 and the client device 120, some or all of the functionality of the automated checkout system 130 may be performed by the shopping cart 100 or the client device 120, and vice versa. Although the automated checkout system 130 is described herein with reference to a shopping cart, the automated checkout system 130 may be mounted in any suitable retail environment, for example a kiosk or checkout counter.

The automated checkout system 130 establishes a session for a user to associate the user's actions with the shopping cart 100 to that user. The user may establish the session by inputting a user identifier (e.g., phone number, email address, username, etc.) into a user interface 110 of the shopping cart 100. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In one or more embodiments, the automated checkout system 130 establishes a session between a user and a shopping cart 100 automatically based on sensor data from the shopping cart 100 or the client device 120. For example, the automated checkout system 130 may determine that the client device 120 and the shopping cart 100 are in proximity to one another for an extended period of time, and thus may determine that the user associated with the client device 120 is using the shopping cart 100.

The automated checkout system 130 generates a shopping list for the user as the user adds items to the shopping cart 100. The shopping list is a list of items that the user has gathered in the storage area 115 of the shopping cart 100 and intends to purchase. The shopping list may include identifiers for the items that the user has gathered (e.g., stock keeping units (SKUs)) and a quantity for each item. As illustrated in FIG. 1, the automated checkout system 130 comprises an item recognition module 150 and an anomaly detection module 160.

The item recognition module 150 identifies items that the user places in their shopping cart. To generate the shopping list, the item recognition module 150 analyzes image data captured by the cameras 105 on the shopping cart 100 and identifies items placed within the shopping cart based on the image data. The item recognition module 150 may use a machine-learning model that is trained to identify items based on image data.

The item recognition module 150 may identify items in the storage area 115 of the shopping cart 100 using any suitable technique. For, the item recognition module 150 may receive inputs from the user of the shopping cart 100 identifying an item placed in the storage area 115 of the shopping cart 100. The user may manually enter an identifier of the item via the user interface 110 or select an identifier of the item via a menu displayed on the user interface 110. In some embodiments, the user scans the barcode on an item, for example via a barcode sensor on the shopping cart 100 (not shown), and the item recognition module 150 identifies the item based on the scanned barcode.

In some embodiments, the item recognition module 150 uses an image recognition model to identify items in the shopping cart's storage area. The image recognition model is a machine-learning model that is trained to identify items based on visual characteristics of the items captured in the image data from the cameras 105. The image recognition model identifies portions of the image that correspond to each item and matches the item to a candidate item within the store. The item recognition module 150 may additionally filter candidate items within the store based on the location of the shopping cart within the store determined by the tracking system 190 and a known or anticipated location of each candidate item within the store.

The item recognition module 150 may apply a barcode detection model to images of items captured in the shopping cart 100 to identify and scan barcodes on items in the storage area 115. The barcode detection model is a machine-learning model trained to identify items by identifying barcodes on the items based on image data captured by the cameras 105. The barcode detection model identifies portions of the image data that correspond to a barcode on an item and determines the identifier for the item (e.g., the SKU number) represented by the barcode. U.S. patent application Ser. No. 17/703,076, entitled "Image-Based Barcode Decoding" and filed Mar. 24, 2022, is incorporated by reference and describes example methods by which an item recognition module may identify items based on image data.

The anomaly detection module 160 detects whether a user is performing anomalous behavior based on the user's interactions with the automated checkout system. The anomaly detection module 160 receives user interaction data describing the user's interactions and computes an anomalous behavior score based on the user interaction data. The anomaly detection module 160 disables features of the The automated checkout system 130 facilitates a checkout by the user through the shopping cart 100. The automated checkout system 130 computes a total cost to the user of the items in the user's shopping list and charges the user for the cost. The automated checkout system 130 may receive payment information from the shopping cart 100 and uses that payment information to charge the user for the items. Alternatively, the automated checkout system 130 may store payment information for the user in user data describing characteristics of the user. The automated checkout system 130 may use the stored payment information as default payment information for the user and charge the user for the cost of the items based on that stored payment information.

In one or more embodiments, a user who interacts with the shopping cart 100 or the client device 120 may be an individual shopping for themselves or a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, which is incorporated by reference herein in its entirety.

The shopping cart 100 and client device 120 can communicate with the automated checkout system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In one or more embodiments, the network 140 may include Bluetooth or near-field communication (NFC) technologies or protocols for local communications between computing devices. The network 140 may transmit encrypted or unencrypted data.

Anomalous Behavior Detection for an Automated Checkout System

Figure 2:
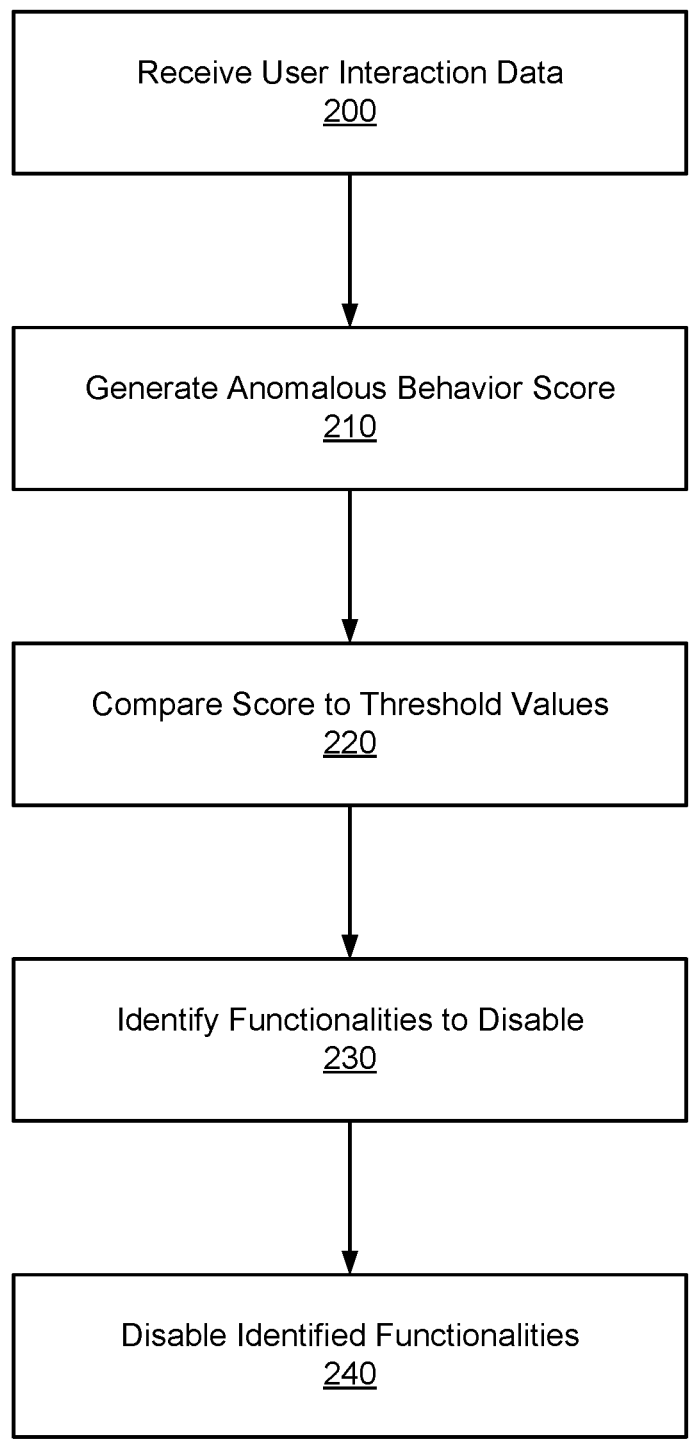
FIG. 2 is a flowchart for an example method for disabling features of an auto-checkout application based on detected anomalous behavior, in accordance with one or more embodiments.

FIG. 2 is a flowchart for an example method for disabling features of an auto-checkout application based on detected anomalous behavior, in accordance with some embodiments. Alternative embodiments may include more, fewer, or different steps from those illustrated in FIG. 2, and the steps may be performed in a different order from that illustrated in FIG. 2. Additionally, each of these steps may be performed automatically by a system (e.g., an automated checkout system 130) with or without human intervention. For the description of this figure, a client device may be a portable computing device (e.g., client device 120) or a smart shopping cart (e.g., shopping cart 100).

An automated checkout system receives 200 user interaction data from a client device operated by a user. User interaction data describes actions performed by the user while interacting with items in a retail location. For example, user interaction data may describe user interactions with content presented by an auto-checkout client application operating on the client device, such as selecting an item, searching for an item or category of items, adding an item to the user's item list through the application, or checking out of the retailer location using the client application. The user interaction data may also describe user actions that are detected by the client device using sensors or cameras of the client device. For example, the client device may use images or sensor data to determine when a user adds or removes an item from a shopping cart, and the user interaction data may describe these additions or removals. Similarly, the client device may include a scanner that reads machine-readable labels (e.g., barcodes or QR codes) and the user interaction data may describe barcodes or QR codes detected by the client device. In some embodiments, the user interaction data includes metadata describing actions described by the user interaction data, such as location data describing a location within the retailer that an action was performed or timing data describing when an action was performed.

The automated checkout system generates 210 an anomalous behavior score that predicts whether the user is engaging in anomalous behavior. Anomalous behavior is one or more actions performed by the user that may be inconsistent with other actions performed by the user or information provided by the user. The automated checkout system may detect different types of anomalous behavior. For example, the anomalous behavior may be malicious behavior where the user is attempting to deceive the automated checkout system. For example, the user may scan one item but add a different item to their shopping cart, provide false identifying information to obtain items they may be prohibited from purchasing, or simply attempt to take an item without providing consideration. Anomalous behavior also may be unintentional, such as where the user forgets to scan an item or accidentally selects an incorrect identifier for an item that they have added to their cart. Anomalous behavior may relate to a particular item (e.g., where the user's interactions with items suggest the user has misidentified the item added to the cart) or to the user's identity (e.g., where the user falsifies their identity to use another user's payment methods for an order).

The automated checkout system generates anomalous behavior scores by applying a behavior scoring model to the user interaction data. A behavior scoring model is a machine-learning model that is trained to predict the likelihood that user interaction data describes anomalous behavior. The behavior scoring model is trained based on a set of training examples. Each training example includes user interaction data and a label that indicates whether the user interaction data depicts anomalous behavior. For example, the user interaction data may be collected from historical data of a user's shopping trip at a retailer location and may be labeled based on a human operator's review of the items that the user collected while at the retailer location. The automated checkout system trains the behavior scoring model by applying the behavior scoring model to the user interaction data of each of the training examples, computing a loss core for each of the training examples based on the labels of the training examples and the resulting anomalous behavior scores, and updating parameters of the behavior scoring model through a backpropagation process with the computed loss scores.

In some embodiments, the behavior scoring model generates an anomalous behavior score for each of the set of types of anomalous behavior. For example, the behavior scoring model may generate an anomalous behavior score that represents anomalous behavior related to falsifying which items the user is collected and a different anomalous behavior score related to whether the user is committing a form of identity theft (e.g., by using a different user's payment method for their shopping). In these embodiments, each anomalous behavior score represents a likelihood that the user interaction data indicates that the user is performing anomalous behavior of the corresponding type. Similarly, in these embodiments, training examples for the behavior scoring model include a label for each type of anomalous behavior.

In some embodiments, the automated checkout system applies the behavior scoring model to user data describing the user to generate the anomalous behavior score for the user interaction data. For example, if the user data for a user indicates that the user normally purchases only vegetarian items but the user interaction data indicates that the user has interacted with meat items, the behavior scoring model may generate a higher anomalous behavior score for the user to reflect the increased likelihood that the user is falsifying their identity. Additionally, the automated checkout system may apply the behavior scoring model to contextual data for the retailer location to generate the anomalous behavior score. The contextual data may include data describing historical interaction trends of users at the retailer location, planogram information describing where items are located within the retailer location, or inventory information at the retailer location.

The automated checkout system uses the anomalous behavior score to disable certain functionalities of the auto-checkout application operating on the client device. These functionalities are features or functions of the auto-checkout application that improve the auto-checkout process as compared to a conventional checkout process (i.e., collecting items in a shopping cart, bringing them to a point-of-sale system with or without a human cashier, and providing payment information at that point-of-sale system). For example, the functionalities of the auto-checkout application may include automatically identifying items as the items are placed in a shopping cart, allowing a user to use stored payment information to pay for the items, or allowing a user to pay for items with lessened or no human review. In some cases, a functionality of the auto-checkout application is an additional feature that the user performs to improve their checkout experience. For example, the auto-checkout application may have functionality allowing the user to scan items on their own as the user travels within the retailer location. A functionality also may allow the user to skip certain other steps in the normal checkout process, such as allowing the user to check out without a human cashier or to automatically apply a stored payment method.

To determine which functionalities to disable, the automated checkout system compares 220 the anomalous behavior score to a set of threshold values. Each of these threshold values corresponds to one or more functionalities of the auto-checkout application to be disabled based on the anomalous threshold score. Threshold values may be ranges of values or may be singular values that are used for an anomalous behavior score unless the score exceeds another, higher threshold value.

The consecutive threshold values may have overlapping functionalities, meaning that a functionality may be disabled for some or all threshold values above some value. For example, the automated checkout system may disable a functionality of using cameras of the client device to automatically identify items for all anomalous behavior scores above some threshold value. In some cases, a functionality may be disabled by a lower threshold value but not disabled for higher threshold values. For example, the automated checkout system may disable the functionality of using cameras to automatically identify items for a subset of the threshold values, but may enable the functionality for anomalous behavior scores above some higher threshold value whereby the automated checkout system disables the functionality that the user can check out without human review. In some embodiments, where the automated checkout system generates anomalous behavior scores for different types of anomalous behavior, the automated checkout system uses a different set of threshold values, and corresponding functionalities, for each anomalous behavior score.

FIG. 3 illustrates example threshold values 300 and corresponding functionalities 310 to be disabled, in accordance with some embodiments. The threshold values 300 illustrated in FIG. 3 are ranges of possible values for an anomalous behavior score, and the listed functionalities 310 are functionalities to be disabled if a user's anomalous behavior score is within the range of the corresponding threshold values.

The automated checkout system identifies 230 which functionalities to disable based on the comparison of the anomalous behavior score and disables 240 the identified functionalities. The automated checkout system may notify the user that the automated checkout system has disabled functionalities of the auto-checkout application by transmitting a message to the client device for display to the user. The automated checkout system may notify the user of which functionalities the system has disabled or may simply notify that some functionalities have been disabled without specifying which ones. Alternatively, the automated checkout system may disable functionalities of the auto-checkout application without notifying the user. The automated checkout system may also take remedial actions with regards to the user based on the anomalous behavior score. For example, the automated checkout system may suspend the user's account for a period of time.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising one or more computer-readable media containing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method, performed by a computer system comprising a processor and a computer-readable medium, comprising:
   receiving user interaction data from a client device associated with a user, wherein the user interaction data describes interactions of the user with the client device through an auto-checkout client application;
   generating an anomalous behavior score for the user based on the received user interaction data, wherein the anomalous behavior score is a score indicating a likelihood that the received user interaction data indicates anomalous behavior performed by the user, and wherein generating the anomalous behavior score comprises inputting the received user data into a behavior scoring model, wherein the behavior scoring model is a machine-learning model that is trained to generate anomalous behavior scores for users based on user interaction data;
   comparing the anomalous behavior score to a set of threshold values, wherein each of the set of threshold values corresponds to a set of functionalities of the auto-checkout client application used by the user;
   identifying a set of functionalities of the auto-checkout client application to disable based on the comparison of the anomalous behavior score and the set of threshold values; and
   disabling the identified set of functionalities of the auto-checkout client application.

2. The method of claim 1, wherein the client device is a smart shopping cart.

3. The method of claim 1, further comprising:
   generating a plurality of anomalous behavior scores for the user by applying the behavior scoring model to the received user interaction data, wherein each anomalous behavior score of the plurality of anomalous behavior scores corresponds to a different type of anomalous behavior.

4. The method of claim 3, further comprising:
   comparing each of the plurality of anomalous behavior scores for the user to a corresponding set of threshold values; and
   identifying the set of functionalities of the auto-checkout client application to disable based on the comparison of plurality of anomalous behavior scores to the corresponding sets of threshold value.

5. The method of claim 1, wherein each of the set of threshold values comprises a range.

6. The method of claim 1, wherein disabling the identified set of functionalities of the auto-checkout client application comprises:
   transmitting a notification to the auto-checkout client application of the client device for display to the user, wherein the notification indicates that functionalities of the auto-checkout client application are disabled.

7. The method of claim 6, wherein the notification specifies the identified set of functionalities.

8. The method of claim 1, further comprising:
   training the behavior scoring model based on a set of training examples by:
   accessing the set of training examples, wherein each training example comprises user interaction data from a user of the automated checkout system and a label indicating whether the user interaction data depicts anomalous behavior by the user;

applying the behavior scoring model to the user interaction data of each of the set of training examples to generate anomalous behavior scores for the set of training examples;

computing a loss score for each training example by comparing each anomalous behavior score to the label of the corresponding training example; and updating a set of parameters of the behavior scoring model by applying a backpropagation process to the behavior scoring model using the computed loss scores.

9. The method of claim 1, wherein generating the anomalous behavior score comprises:

applying the behavior scoring model to user data describing the user.

10. The method of claim 1, wherein generating the anomalous behavior score comprises:

applying the behavior scoring model to contextual data describing a context for the user interaction data.

11. A non-transitory computer-readable medium storing instructions that, when executed by a processor, cause the processor to perform operations comprising:

receiving user interaction data from a client device associated with a user, wherein the user interaction data describes interactions of the user with the client device through an auto-checkout client application;

generating an anomalous behavior score for the user based on the received user interaction data, wherein the anomalous behavior score is a score indicating a likelihood that the received user interaction data indicates anomalous behavior performed by the user, and wherein generating the anomalous behavior score comprises inputting the received user data into a behavior scoring model, wherein the behavior scoring model is a machine-learning model that is trained to generate anomalous behavior scores for users based on user interaction data;

comparing the anomalous behavior score to a set of threshold values, wherein each of the set of threshold values corresponds to a set of functionalities of the auto-checkout client application used by the user;

identifying a set of functionalities of the auto-checkout client application to disable based on the comparison of the anomalous behavior score and the set of threshold values; and disabling the identified set of functionalities of the auto-checkout client application.

12. The non-transitory computer-readable medium of claim 11, wherein the client device is a smart shopping cart.

13. The non-transitory computer-readable medium of claim 11, the operations further comprising:

generating a plurality of anomalous behavior scores for the user by applying the behavior scoring model to the received user interaction data, wherein each anomalous behavior score of the plurality of anomalous behavior scores corresponds to a different type of anomalous behavior.

14. The non-transitory computer-readable medium of claim 13, the operations further comprising:

comparing each of the plurality of anomalous behavior scores for the user to a corresponding set of threshold values; and identifying the set of functionalities of the auto-checkout client application to disable based on the comparison of plurality of anomalous behavior scores to the corresponding sets of threshold value.

15. The non-transitory computer-readable medium of claim 11, wherein each of the set of threshold values comprises a range.

16. The non-transitory computer-readable medium of claim 11, wherein disabling the identified set of functionalities of the auto-checkout client application comprises:

transmitting a notification to the auto-checkout client application of the client device for display to the user, wherein the notification indicates that functionalities of the auto-checkout client application are disabled.

17. The non-transitory computer-readable medium of claim 16, wherein the notification specifies the identified set of functionalities.

18. The non-transitory computer-readable medium of claim 11, the operations further comprising:

training the behavior scoring model based on a set of training examples by:

accessing the set of training examples, wherein each training example comprises user interaction data from a user of the automated checkout system and a label indicating whether the user interaction data depicts anomalous behavior by the user;

applying the behavior scoring model to the user interaction data of each of the set of training examples to generate anomalous behavior scores for the set of training examples;

computing a loss score for each training example by comparing each anomalous behavior score to the label of the corresponding training example; and updating a set of parameters of the behavior scoring model by applying a backpropagation process to the behavior scoring model using the computed loss scores.

19. The non-transitory computer-readable medium of claim 11, wherein generating the anomalous behavior score comprises:

applying the behavior scoring model to user data describing the user.

20. A system comprising:

a processor; and a non-transitory computer-readable medium storing instructions that, when executed by the processor, cause the processor to perform operations comprising:

receiving user interaction data from a client device associated with a user, wherein the user interaction data describes interactions of a user with the client device through an auto-checkout client application;

generating an anomalous behavior score for the user based on the received user interaction data, wherein the anomalous behavior score is a score indicating a likelihood that the received user interaction data indicates anomalous behavior performed by the user, and wherein generating the anomalous behavior score comprises inputting the received user data into a behavior scoring model, wherein the behavior scoring model is a machine-learning model that is trained to generate anomalous behavior scores for users based on user interaction data;

comparing the anomalous behavior score to a set of threshold values, wherein each of the set of threshold values corresponds to a set of functionalities of the auto-checkout client application used by the user;

identifying a set of functionalities of the auto-checkout client application to disable based on the comparison of the anomalous behavior score and the set of threshold values; and disabling the identified set of functionalities of the auto-checkout client application.

* * * * *